(12) United States Patent
Pepitone et al.

(10) Patent No.: US 9,146,133 B2
(45) Date of Patent: Sep. 29, 2015

(54) METHODS AND SYSTEMS FOR DISPLAYING PROCEDURE INFORMATION ON AN AIRCRAFT DISPLAY

(75) Inventors: Dave Pepitone, Sun City West, AZ (US); Roger W. Burgin, Scottsdale, AZ (US); Keith Hughes, Peoria, AZ (US); Amit Srivastav, Karnataka (IN); Allan R. Hart, Phoenix, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 13/154,130

(22) Filed: Jun. 6, 2011

(65) Prior Publication Data

US 2012/0310524 A1 Dec. 6, 2012

(51) Int. Cl.
*G06F 7/00* (2006.01)
*G06F 17/00* (2006.01)
*G01C 23/00* (2006.01)
*G08G 5/00* (2006.01)
*G08G 5/02* (2006.01)

(52) U.S. Cl.
CPC ............. *G01C 23/00* (2013.01); *G08G 5/0013* (2013.01); *G08G 5/0021* (2013.01); *G08G 5/025* (2013.01)

(58) Field of Classification Search
USPC ................... 701/431, 532, 409, 8, 14, 411, 4; 718/100; 725/76; 348/14.03; 342/357.36; 345/418
See application file for complete search history.

(56) References Cited

U.S. PATENT DOCUMENTS

| | | | | |
|---|---|---|---|---|
| 3,680,086 A | * | 7/1972 | Valstar | 342/81 |
| 4,489,389 A | * | 12/1984 | Beckwith et al. | 345/421 |
| 4,660,157 A | * | 4/1987 | Beckwith et al. | 345/421 |
| 5,297,051 A | * | 3/1994 | Arakawa et al. | 701/520 |
| 5,396,430 A | * | 3/1995 | Arakawa et al. | 701/446 |
| 5,410,485 A | * | 4/1995 | Ichikawa | 701/428 |
| 5,689,717 A | | 11/1997 | Pritt | |
| 6,154,219 A | | 11/2000 | Wiley et al. | |
| 6,199,008 B1 | | 3/2001 | Aratow et al. | |
| 6,289,278 B1 | * | 9/2001 | Endo et al. | 701/431 |

(Continued)

FOREIGN PATENT DOCUMENTS

| | | | |
|---|---|---|---|
| EP | 2741053 A2 | * | 6/2014 |
| JP | 3-52542 | * | 3/1991 |

(Continued)

OTHER PUBLICATIONS

The use of enhanced information displays to support procedure following;Landry, S.J.; Jacko, J.A.; Digital Avionics Systems Conference, 2004. DASC 04. The 23rd; vol. 1; Digital Object Identifier: 10.1109/DASC.2004.1391341 Publication Year: 2004 , pp. 5.C.5-5.1-9 vol. 1.*

(Continued)

*Primary Examiner* — Cuong H Nguyen
(74) *Attorney, Agent, or Firm* — Ingrassia Fisher & Lorenz, P.C.

(57) ABSTRACT

Methods and systems are provided for presenting information on a display device associated with an aircraft. An exemplary method involves displaying a navigational map on the display device, obtaining status information for the aircraft, determining an amount of procedure information to be displayed based at least in part on the status information, and displaying the determined amount of aircraft procedure information on the display device overlying the navigational map. The procedure information prescribes operation of the aircraft during execution of an aircraft procedure.

23 Claims, 12 Drawing Sheets

(56) References Cited

U.S. PATENT DOCUMENTS

| | | | |
|---|---|---|---|
| 6,314,363 B1* | 11/2001 | Pilley et al. | 701/120 |
| 6,453,234 B1* | 9/2002 | Noguchi et al. | 701/431 |
| 6,466,235 B1 | 10/2002 | Smith et al. | |
| 6,493,630 B2 | 12/2002 | Ruiz et al. | |
| 6,522,958 B1 | 2/2003 | Dwyer et al. | |
| 6,565,610 B1 | 5/2003 | Wang et al. | |
| 6,633,801 B1 | 10/2003 | Durlacher et al. | |
| 6,633,810 B1 | 10/2003 | Qureshi et al. | |
| 6,940,530 B2 | 9/2005 | Chen et al. | |
| 7,072,746 B1* | 7/2006 | Burch | 701/14 |
| 7,089,110 B2 | 8/2006 | Pechatnikov et al. | |
| 7,231,599 B2 | 6/2007 | Yamada et al. | |
| 7,414,637 B2 | 8/2008 | Fogel et al. | |
| 7,471,995 B1 | 12/2008 | Robinson | |
| 7,499,771 B2 | 3/2009 | Caillaud | |
| 7,542,682 B2 | 6/2009 | Agrawala et al. | |
| 7,542,882 B2 | 6/2009 | Agrawala et al. | |
| 7,551,994 B2* | 6/2009 | Odinak et al. | 701/29.1 |
| 7,685,083 B2* | 3/2010 | Fairweather | 706/45 |
| 7,693,621 B1 | 4/2010 | Chamas | |
| 7,693,652 B2 | 4/2010 | Cheung | |
| 7,769,501 B2 | 8/2010 | Lusardi et al. | |
| 8,126,214 B2 | 2/2012 | Morbey et al. | |
| 8,370,005 B2 | 2/2013 | Wilson et al. | |
| 8,380,366 B1* | 2/2013 | Schulte et al. | 701/3 |
| 8,532,844 B2 | 9/2013 | Wilson et al. | |
| 2003/0009694 A1* | 1/2003 | Wenocur et al. | 713/201 |
| 2004/0006412 A1 | 1/2004 | Doose et al. | |
| 2005/0283305 A1 | 12/2005 | Clark et al. | |
| 2006/0058949 A1 | 3/2006 | Fogel et al. | |
| 2007/0096945 A1 | 5/2007 | Rasmussen et al. | |
| 2007/0286164 A1 | 12/2007 | Gordon et al. | |
| 2007/0288164 A1 | 12/2007 | Gordon et al. | |
| 2008/0027629 A1 | 1/2008 | Peyrucain et al. | |
| 2008/0125962 A1* | 5/2008 | Wipplinger et al. | 701/201 |
| 2008/0140270 A1* | 6/2008 | Davis et al. | 701/8 |
| 2008/0147320 A1* | 6/2008 | Burch | 701/211 |
| 2008/0201029 A1 | 8/2008 | Brown et al. | |
| 2008/0319661 A1 | 12/2008 | Werner et al. | |
| 2009/0052806 A1 | 2/2009 | Morbey et al. | |
| 2009/0231164 A1 | 9/2009 | Burgin et al. | |
| 2009/0292462 A1 | 11/2009 | Babetski | |
| 2009/0315881 A1* | 12/2009 | Matsumoto et al. | 345/418 |
| 2010/0023259 A1 | 1/2010 | Krumm et al. | |
| 2010/0026525 A1* | 2/2010 | Feyereisen et al. | 340/972 |
| 2010/0070176 A1* | 3/2010 | Feyereisen et al. | 701/211 |
| 2010/0114483 A1 | 5/2010 | Heo et al. | |
| 2010/0127895 A1 | 5/2010 | Wilson et al. | |
| 2010/0131126 A1* | 5/2010 | He et al. | 701/14 |
| 2010/0131481 A1 | 5/2010 | Suddreth et al. | |
| 2010/0148990 A1 | 6/2010 | Burgin et al. | |
| 2010/0161160 A1 | 6/2010 | Wilson et al. | |
| 2010/0211237 A1* | 8/2010 | Nichols et al. | 701/14 |
| 2010/0220113 A1 | 9/2010 | Kennedy | |
| 2010/0241021 A1* | 9/2010 | Morikawa et al. | 600/544 |
| 2010/0250030 A1* | 9/2010 | Nichols et al. | 701/7 |
| 2010/0262318 A1 | 10/2010 | Ariens | |
| 2010/0265268 A1 | 10/2010 | Wilson et al. | |
| 2010/0280753 A1 | 11/2010 | Chytil et al. | |
| 2011/0010082 A1 | 1/2011 | Wilson et al. | |
| 2011/0118908 A1 | 5/2011 | Boorman et al. | |
| 2011/0264437 A1 | 10/2011 | Wise et al. | |
| 2012/0310450 A1 | 12/2012 | Srivastav et al. | |
| 2013/0035848 A1 | 2/2013 | Burgin et al. | |
| 2014/0163784 A1* | 6/2014 | Parthasarathy | 701/15 |

FOREIGN PATENT DOCUMENTS

| | | | |
|---|---|---|---|
| JP | 3-095262 | * | 4/1991 |
| JP | 4-284263 | * | 10/1992 |
| WO | WO01/31296 | * | 5/2001 |

OTHER PUBLICATIONS

Scentindex: Conceptually Reorganizing Subject Indexes for Reading; Chi, E.H.; Lichan Hong; Heiser, J.; Card, S.K. Visual Analytics Science and Technology, 2006 IEEE Symposium on; Digital Object Identifier: 10.1109/VAST.2006.261418 Publication Year: 2006 , pp. 159-166.*

En-route flight deck-based merging and spacing impact on flight crew operations; Bone, R.S. ; Penhallegon, W.J.; Digital Avionics Systems Conference, 2007. DASC '07. IEEE/AIAA 26th; Digital Object Identifier: 10.1109/DASC.2007.4391873 Publication Year: 2007 , pp. 3.A.4-1-3.A.4-12.*

Effects of traffic display size and location on visual separation during visual approaches: Cockpit Display of Traffic Information (CDTI) Enhanced Flight Rules (CEFR); Bone, R.S. et al., Digital Avionics Syst. Conf, 2003. DASC '03. The 22nd; vol. 2; Digital Object Id: 10.1109/DASC.2003.1245907 Pub. Year: 2003 , pp. 9.B.2-91-12 vol. 2.*

Methods for maintaining benefits for merging aircraft on terminal RNAV routes; Becker, T.A.; Barker, D.R.; Smith, A.P.; Digital Avionics Systems Conference, 2004. DASC 04. The 23rd; Year: 2004, vol. 1; pp. 2.E.1-21-13 vol. 1, DOI: 10.1109/DASC.2004.1391278.*

Human factors flight trial analysis for 2D moving map and 3D synthetic vision displays; Schiefele, J.; Pschierer, C.; Wipplinger, P.; Howland, D.; Digital Avionics Systems Conference, 2005. DASC 2005. The 24th Year: 2005, vol. 1; pp. 5.B.1-51-15 vol. 1, DOI: 10.1109/DASC.2005.1563374.*

Effects of traffic display size and location on visual separation during visual approaches: Cockpit Display of Traffic Information (CDTI) Enhanced Flight Rules (CEFR); Bone, R.S.; Helleberg, J.; Domino, D.; Narkus-Kramer, M.; Johnson, N. ; Digital Avionics Systems Conference, 2003. DASC '03. The 22nd; Year: 2003, vol. 2; pp. 9.B.2- 91-12 vo.*

Continuous ECG Transmission via Mobile Telephone Network and Waiting Time of Packets for Smooth Display; Silapaporn, P.; Chutatape, O.; Computational Intelligence, Communication Systems and Networks (CICSyN), 2012 Fourth International Conf., Year: 2012; pp. 137-142, DOI: 10.1109/CICSyN.2012.34.*

MFD STD, TRF, RDR, RDR/TRF With or Without Chartview Available; Retrieved from Internet:, < URL: www.apgavionics.com/product.php?p_id=471>.

Garmin, G1000 Multi Function Display Pilots Guide for Cessna Nav III; 190-00392-02 Rev. A; 2004 Garmin Ltd.

Avidyne, Entegra EX5000C, Cirrus SR20 and SR22 Multi-Function Display Pilot's Guide; 600-00108-000 Rev 07, 2007 AVIDYNE Corporation.

Abhizna Butchibabu, et al.; Evaluting a De-Cluttering Technique for NextGen RNAV and RNP Charts; submitted for publication to the 31st Digital Avionics Systems Conference Oct. 14-18, 2012, Williamsburgh, VA.

MFD STD, TRF, RDR, RDR/TRF With or Without Chartview Available; Retrieved from Internet:, < URL.: www.apgavionics.com/product.php?p_id=471>.

Garmin, G1000 Multi Function Display Pilot's Guide for Cessna Nav III; 190-00302-02 Rev. A; 2004 Garmin Ltd.

Avidyne, Entegra EX50000, Cirrus SR2O and SR22 Multi-Function Display Pilot's Guide; 600-00108-000 Rev 07, 2007 Avidyne Corporation.

Abhizna Butchibabli, et al.; Evaluting a De-Cluttering Technique for NextGen RNAV and RNP Charts; submitted for publication to the 31st Digital Avionics Systems Conference Oct. 14-18, 2012, Williamsburgh, VA.

* cited by examiner

METHODS AND SYSTEMS FOR DISPLAYING PROCEDURE INFORMATION ON AN AIRCRAFT DISPLAY

TECHNICAL FIELD

The subject matter described herein relates generally to avionics systems, and more particularly, embodiments of the subject matter relate to displaying content on a display associated with an aircraft.

BACKGROUND

Published aeronautical charts, such as, for example, Instrument Approach Procedure (IAP) charts, Standard Terminal Arrival (STAR) charts, Standard Instrument Departure (SID) charts, Departure Procedures (DP), terminal procedures, approach plates, and the like, depict and describe the procedures for operating aircraft at or in the vicinity of an airport, runway, or other landing and/or departure location. These charts graphically illustrate and describe the specific procedure information and instructions (e.g., minimum descent altitudes, minimum runway visual range, final course or heading, relevant radio frequencies, missed approach procedures) to be followed or otherwise utilized by a pilot for executing a particular aircraft procedure. These charts are typically provided by a governmental or regulatory organization, such as, for example, the Federal Aviation Administration in the United States. Traditionally, a pilot would maintain copies of these printed charts for the various possible airports that the pilot may encounter during operation of the aircraft. For example, for worldwide operation, there are as many as 17,000 charts.

Electronic displays in many modern flight deck displays (or cockpit displays) are eliminating the need to maintain paper charts for the various procedures that a pilot may need to execute. However, the size of the electronic display inside an aircraft cockpit is often limited due to the number of instruments and human-machine interface elements inside the cockpit (e.g., joysticks, knobs, buttons, and the like) along with the need for the pilot to have an unobstructed view outside the aircraft. Furthermore, some of the display area on the electronic display may be utilized or reserved for other processes (e.g., primary flight displays, synthetic vision displays, vertical situation displays, flight management windows, and the like). As a result of these display constraints along with the quantity of information contained on the procedure charts, it is difficult to display all of the desired procedure information for operating the aircraft in a clear and uncluttered manner.

BRIEF SUMMARY

A method is provided for presenting information on a display device associated with an aircraft. The method involves displaying a navigational map on the display device, obtaining status information for the aircraft, determining an amount of procedure information to be displayed based at least in part on the status information, and displaying the determined amount of aircraft procedure information on the display device overlying the navigational map. The procedure information prescribes operation of the aircraft during execution of an aircraft procedure.

In another embodiment, a system suitable for use with an aircraft is provided. The system includes a display device onboard an aircraft, a data storage element configured to maintain procedure information for an aircraft procedure, and a processing system coupled to the display device and the data storage element. The display device has a navigational map pertaining to operation of the aircraft displayed thereon, wherein the processing system is configured to obtain status information for the aircraft, determine an amount of the procedure information to be displayed based at least in part on the status information, display the determined amount of aircraft procedure information on the display device overlying the navigational map.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements.

DETAILED DESCRIPTION

The following detailed description is merely exemplary in nature and is not intended to limit the subject matter of the application and uses thereof. Furthermore, there is no intention to be bound by any theory presented in the preceding background or the following detailed description.

Embodiments of the subject matter described herein relate to displaying aircraft procedure information prescribing operation of an aircraft on a display device. As described in greater detail below, the aircraft procedure information for the appropriate procedure includes one or more symbolic elements and textual information associated with the respective symbolic element(s), wherein the combination of symbolic elements and textual information define the manner in which the aircraft is to be operated when executing that procedure. In exemplary embodiments, the symbolic elements of the aircraft procedure are displayed at their appropriate geographic locations overlying a navigational map. An amount (or quantity) of the textual information associated with the displayed symbolic elements that is to be displayed on the navigational map is determined based on one or more display settings for the navigational map and information indicative of the current and/or instantaneous aircraft operating state (e.g., flight phase, location, altitude, and/or the like). That determined amount of the textual information is then displayed overlying the navigational map proximate to or otherwise in association with the displayed symbolic elements. As described in greater detail below, the navigational map is dynamically updated as the aircraft travels, such that the amount of textual information displayed on the navigational map increases and/or decreases in a manner that is influenced by the operation of the aircraft. Additionally, when the display setting(s) of the navigational map is adjusted, the amount of textual information displayed on the navigational map is increased and/or decreased based on the new display setting(s). As described in greater detail below, the textual information may be categorized and/or prioritized in a manner such that the higher priority textual information is displayed preferentially to lower priority textual information. As a result, the higher priority (or most relevant) textual information is reliably displayed on the navigational map and without being obscured and/or obfuscated by lower priority (or less relevant) information, while the lower priority (or less relevant) textual information is added and/or removed from the navigational map based on the most recently obtained status information for the aircraft to supplement the higher priority textual information when that lower priority textual information is relevant to the current operation of the aircraft.

Figure 1:
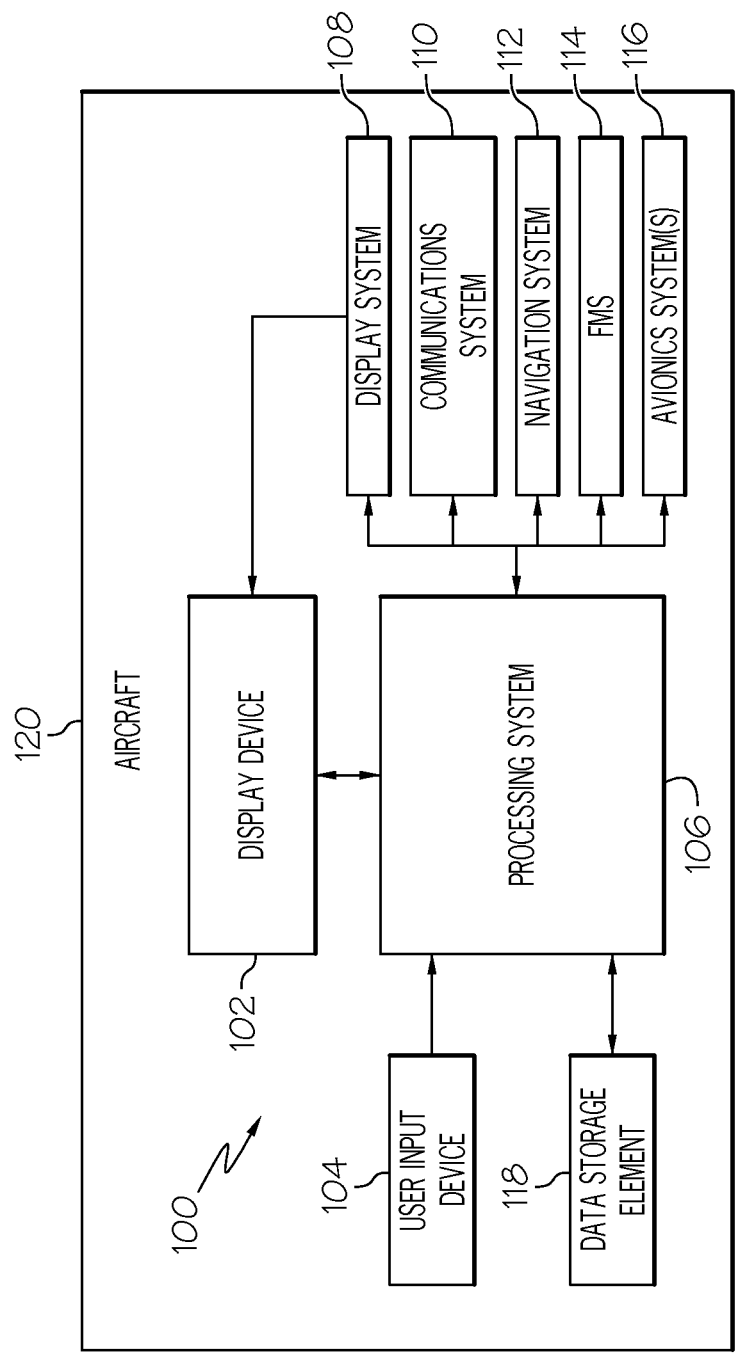
FIG. 1 is a block diagram of a system suitable for use with an aircraft in accordance with one embodiment.

FIG. 1 depicts an exemplary embodiment of a system 100 which may be utilized with a vehicle, such as an aircraft 120. In an exemplary embodiment, the system 100 includes, without limitation, a display device 102, a user input device 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, wherein the processing system 106 and the display system 108 are cooperatively configured to display, render, or otherwise convey one or more graphical representations or images associated with operation of the aircraft 120 on the display device 102, as described in greater detail below. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device 104 may be realized as a keypad, touchpad, keyboard, mouse, touch panel (or touchscreen), joystick, knob, line select key or another suitable device adapted to receive input from a user. In some embodiments, the user input device 104 is realized as an audio input device, such as a microphone, audio transducer, audio sensor, or the like, that is adapted to allow a user to provide audio input to the system 100 in a "hands free" manner without requiring the user to move his or her hands, eyes and/or head to interact with the system 100.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. In some embodiments, when the user input device 104 is realized as an audio input device, the processing system 106 may implement a speech recognition engine (or voice recognition engine) and/or speech-to-text system adapted to receive audio input from a user. In this regard, the processing system 106 may also include one or more analog-to-digital converters (ADCs), digital-to-analog converters (DACs), analog filters and/or digital filters suitably configured to support operations of the system 100.

The display system 108 generally represents the hardware, software, and/or firmware components configured to control the display and/or rendering of one or more navigational maps and/or other displays pertaining to operation of the aircraft 120 and/or systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, a terminal airspace database, a special use airspace database, or other information for rendering and/or displaying navigational maps and/or other content on the display device 102.

As described in greater detail below, in an exemplary embodiment, the processing system 106 includes or otherwise accesses data storage element 118, which contains aircraft procedure information (or instrument procedure information) for a plurality of airports and maintains the association of the aircraft procedure information and the corresponding airport. As used herein, aircraft procedure information should be understood as a set of operating parameters or instructions associated with a particular aircraft action (e.g., approach, departure, arrival, climbing, and the like) that may be undertaken by the aircraft 120 at or in the vicinity of a particular airport. In an exemplary embodiment, the aircraft procedure information for a particular aircraft action includes graphic elements (e.g., symbols for navigational reference points, navigational segments, procedure turns, and the like) that graphically illustrate that aircraft action and textual information associated with the graphic elements that further describe the operating parameters or instructions for executing that aircraft action. For example, an instrument approach procedure for an airport may include symbols and navigational segments that graphically illustrate the approach course along with procedure turns for transitioning to/from the approach course, and additionally, the approach procedure includes textual information associated with the symbols and/or navigational segments that describe the operating parameters or provide instructions for operating the aircraft at or in the vicinity of those symbols and/or navigational segments.

In an exemplary embodiment, the data storage element 118 maintains priority criteria for the textual information associated with the graphic elements of an aircraft procedure (or instrument procedure). As described in greater detail below, a graphic element of an aircraft procedure may include a number of different categories or types of textual information associated therewith. For example, a symbol for a navigational reference point (e.g., a waypoint, positional fix, radio ground station (VORs, VORTACs, TACANs, and the like), distance measuring equipment, non-directional beacon, or the like) may have an associated name, designation for the type of position fix (e.g., initial approach fix, final approach fix, or the like), names of other navigational reference points and the distances to/from those other navigational reference points, a minimum altitude at that navigational reference point, and the like. Likewise, a navigational segment may have an associated bearing (or heading), a minimum altitude, a distance (or length), and the like. In this regard, each category or type of textual information may be assigned a priority criterion or value to facilitate identifying or otherwise determining a subset of the textual information for display on the display device 102 based on the relative priorities to ensure the most relevant textual information is displayed during operation of the aircraft 120.

As used herein, an airport should be understood as referring to a location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. Each airport may have one or more predefined aircraft procedures associated therewith, wherein the aircraft procedure information for each aircraft procedure at each respective airport may be maintained by the data storage element 118. The aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. Depending on the embodiment, the data storage element 118 may be physically realized using RAM memory, ROM memory, flash memory, registers, a hard disk, or another suitable data storage medium known in the art or any suitable combination thereof. In an exemplary embodiment, the processing system 106, the display system 108, and/or the FMS 114 are cooperatively configured to render and/or display aircraft procedure information overlying a navigational map on the display device 102, as described in greater detail below. It should be noted that although the subject matter is described below in the context of arrival procedures and/or approach procedures for purposes of explanation, the subject matter is not intended to be limited to use with any particular type of aircraft procedure and may be implemented for other aircraft procedures (e.g., departure procedures or en route procedures) in an equivalent manner.

Still referring to FIG. 1, in an exemplary embodiment, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system or another suitable data link system.

In an exemplary embodiment, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In accordance with one or more embodiments, the FMS 114 (or another avionics system 116) is configured to determine, track, or otherwise identify the current flight phase of the aircraft 120. As used herein, a flight phase of the aircraft 120 should be understood as a distinguishable segment of the operation (or distinguishable operating phase) of the aircraft 120 associated with traversing the aircraft 120 from a starting location to an ending location. For example, operation of the aircraft 120 from a starting location (e.g., a terminal at a first airport) to an ending location (e.g., a terminal at a second airport) usually comprises a plurality of flight phases, such as, for example, a standing phase (e.g., when the aircraft is stationary on the ground), a pushback or towing phase (e.g., when the aircraft is moving on the ground with assistance), a taxiing phase, a takeoff phase, a climbing phase (e.g., including the initial climb and/or climb to cruise), a cruising phase, a descent phase (e.g., from cruise altitude to initial approach), an arrival phase, an approach phase, a landing phase, a rollout phase, and the like. Various phases of flight are well known, and will not be described in detail herein. It should be noted that the phases of flight may be combined and/or categorized in numerous possible manners and/or each phase of flight may comprise numerous sub-phases (for example, an approach phase may include sub-phases for holding, procedure turn, flyover, orbit, and the like), and the subject matter is not intended to be limited to any particular number and/or classification of flight phases.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the display system 108 or the FMS 114. In other words, some embodiments may integrate the processing system 106 with the display system 108 or the FMS 114.

Figure 2:
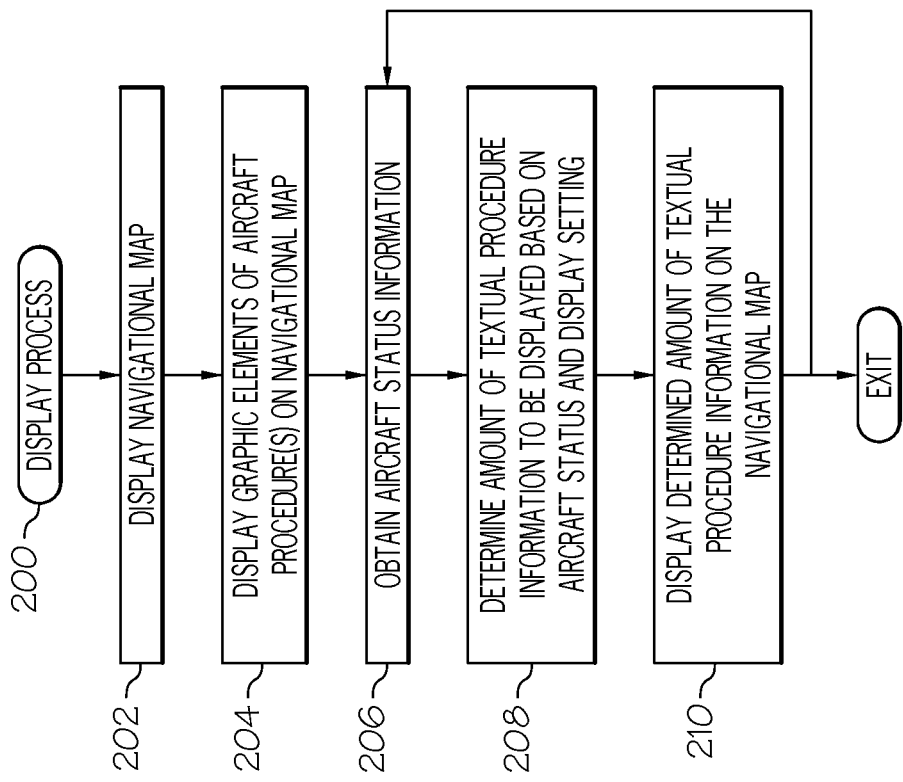
FIG. 2 is a flow diagram of an exemplary display process suitable for use with the system of FIG. 1 in accordance with one embodiment.

Referring now to FIG. 2, in an exemplary embodiment, the system 100 may be configured to perform a display process 200 and additional tasks, functions, and operations described below. The various tasks may be performed by hardware, firmware, software, or any combination thereof. For illustrative purposes, the following description may refer to elements mentioned above in connection with FIG. 1. In practice, the tasks, functions, and operations may be performed by different elements of the described system, such as the display device 102, the user input device 104, the processing system 106, the display system 108, the communications system 110, the navigation system 112, the FMS 114, the avionics system(s) 116, and/or the data storage element 118. It should be appreciated that any number of additional or alternative tasks may be included, and may be incorporated into a more comprehensive procedure or process having additional functionality not described in detail herein.

Figure 3:
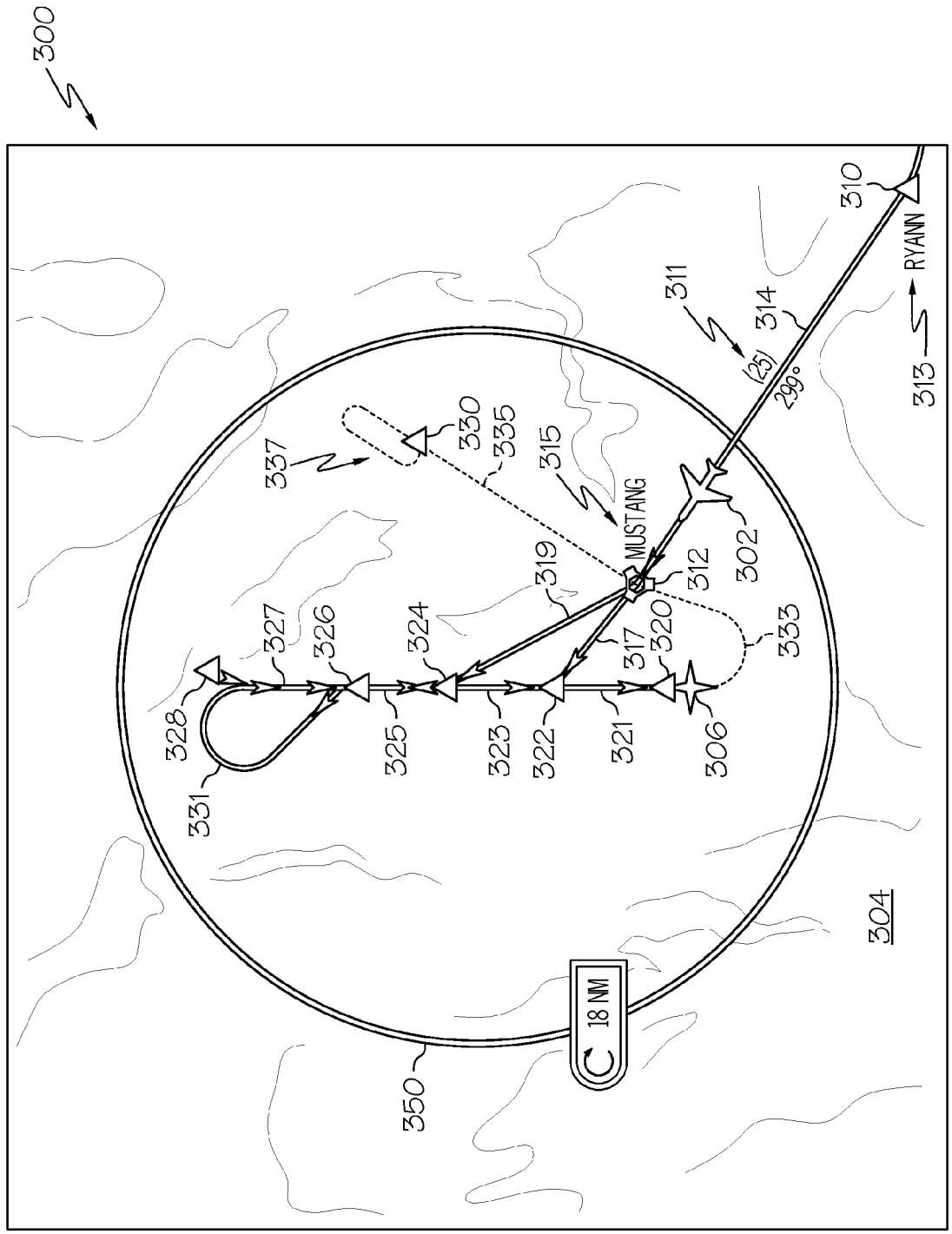
FIG. 3 is a schematic view of an exemplary navigational map suitable for use with the display process of FIG. 2 in accordance with one embodiment.

In an exemplary embodiment, the display process 200 begins by rendering or otherwise displaying a navigational map relating to operation of an aircraft in a viewing area on a display device associated with the aircraft (task 202). For example, referring now to FIG. 3, and with continued reference to FIG. 1 and FIG. 2, the display system 108 and/or processing system 106 may display and/or render a navigational map 300 associated with the current (or instantaneous) location of the aircraft 120 on the display device 102 onboard the aircraft 120. In an exemplary embodiment, a graphical representation 302 of the aircraft 120 is rendered and/or displayed on the map 300, and the graphical representation of the aircraft 302 is overlaid or rendered on top of a background 304. The background 304 comprises a graphical representation of the terrain, topology, or other suitable items or points of interest corresponding to (or within a given distance of) a location of the aircraft 120, which may be maintained (e.g., by the display system 108) in a terrain database, a navigational database, a geopolitical database, or another suitable database. For example, as illustrated in FIG. 3, the display system 108 may render a graphical representation of nearby navigational aids (e.g., VORs, VORTACs, DMEs, and the like) and airports overlying the background 304, including the airport 306 that the aircraft 120 is en route to. Although not illustrated in FIG. 3, some embodiments of navigational map 300 may include graphical representations of airspace designations and/or airspace restrictions, cities, towns, roads, railroads, and other geo-political information. Although FIG. 3 depicts a top view (e.g., from above the aircraft 302) of the navigational map 300, in practice, alternative embodiments may utilize various perspective views, such as side views, three-dimensional views (e.g., a three-dimensional synthetic vision display), angular or skewed views, and the like.

In an exemplary embodiment, the navigational map 300 is associated with the movement of the aircraft 120, and the aircraft graphic 302 and/or background 304 refreshes or otherwise updates as the aircraft 120 travels, such that the graphical representation of the aircraft 302 is positioned over the terrain background 304 in a manner that accurately reflects the current (e.g., instantaneous or substantially real-time) real-world positioning of the aircraft 120 relative to the earth. In some embodiments, the aircraft graphic 302 is shown as traveling across the navigational map 300 (e.g., by updating the location of the aircraft graphic 302 with respect to the background 304), while in other embodiments, the aircraft graphic 302 may be located at a fixed position on the navigational map 300 (e.g., by updating the background 304 with respect to the aircraft graphic 302 such that the map 300 is maintained centered on and/or aligned with the aircraft graphic 302). In the illustrated embodiment of FIG. 3, the navigational map 300 is oriented north-up (i.e., moving upward on the map 300 corresponds to traveling northward), however, in alternative embodiments, the orientation of the navigational map 300 may be track-up or heading-up (i.e., aligned such that the aircraft graphic 302 is always traveling in an upward direction and the background 304 adjusted accordingly), as described in greater detail below.

Referring again to FIG. 2, and with reference to FIG. 1 and FIG. 3, in an exemplary embodiment, the display process 200 continues by rendering or otherwise displaying a graphical representation of one or more aircraft procedures on the navigational map (task 204). As described above, the aircraft procedure information for each aircraft procedure maintained by the data storage element 118 includes graphic elements (e.g., symbols, line segments, images, objects, or other graphical representations) that graphically illustrate one or more aspects of the aircraft procedure and textual information associated with the various graphic elements, wherein the combination of graphic elements and textual information prescribes the manner in which that particular aircraft action should be undertaken by the aircraft 120 at or in the vicinity of a particular airport. In an exemplary embodiment, the display process 200 identifies the appropriate aircraft procedures for the aircraft 120 and displays the graphic elements for those identified aircraft procedures that are within the currently displayed area of the navigational map 300. In some embodiments, the display process 200 may identify the appropriate aircraft procedure information to be displayed on the map 300 based on the flight plan maintained by the FMS 114. For example, the flight plan maintained by the FMS 114 may specify airport 306 as the desired airport for landing the aircraft 120, along with the desired approach and/or arrival route for that airport. In other embodiments, the display process 200 may identify airport 306 as a desired airport for landing the aircraft 120 based on airport 306 being the final entry (or destination) of a flight plan maintained by FMS 114, and then determine the desired approach and/or arrival route for airport 306 based on the current heading and/or location of the aircraft 120 (e.g., the approach and/or arrival route closest to the location of the aircraft 120 and/or most closely aligned with the current heading of the aircraft 120). In yet other embodiments, the user may manipulate the user input device 104 to select or otherwise indicate the desired aircraft procedure information to be displayed for the airport 306.

The illustrated embodiment of FIG. 3 reflects the navigational map 300 after the display process 200 identifies the "RYANN ONE" standard terminal arrival route as the desired arrival route for the airport 306 and the "ILS RWY 16R" instrument approach as the desired approach for the airport 306. For example, the processing system 106 may identify the "RYANN ONE" standard terminal arrival route based on the flight plan maintained by the FMS 114, and then access the data storage element 118 to obtain information regarding the geographic locations of the graphic elements of the "RYANN ONE" standard terminal arrival route to determine which graphic elements are within the currently displayed area of the navigational map 300 and display those graphic elements at their appropriate geographic locations with respect to the background 304 and/or aircraft 302. As shown, the processing system 106 displays the symbol 310 for the navigational reference point RYANN and the symbol 312 for the navigational reference point MUSTANG at their appropriate geographic locations on the map 300 along with the navigational segment 314 delineating the flight path between the two reference points 310, 312. In a similar manner, the processing system 106 may identify the "ILS RWY 16R" instrument approach as the desired approach based on the flight plan maintained by the FMS 114, and then access the data storage element 118 to obtain information regarding the geographic locations of the graphic elements of the "ILS RWY 16R" instrument approach to determine which graphic elements are within the currently displayed area of the navigational map 300 and display those graphic elements at their appropriate geographic locations with respect to the background 304 and/or aircraft 302. As illustrated, the processing system 106 displays the symbols 320, 322, 324, 326, 328, 330 for the navigational reference points of the ILS RWY 16R approach at their appropriate geographic locations on the map 300, such that each navigational reference point symbol 320, 322, 324, 326, 328, 330 is positioned overlying the background 304 in a manner that accurately reflects the real-world geographic location of its associated navigational reference point. The processing system 106 also displays the navigational segments 317, 319, 321, 323, 325, 327, 335 between navigational reference points, procedure turns 331, 333, and missed approach procedures 337 for the ILS RWY 16R approach, as illustrated in FIG. 3 and described in greater detail below.

Referring again to FIG. 2, in an exemplary embodiment, the display process 200 continues by obtaining current (or instantaneous) status information for the aircraft (task 206). For example, the processing system 106 may obtain (e.g., from FMS 114, navigation system 112 and/or other avionic systems 116) one or more of the following: the current flight phase for the aircraft 120, the current location of the aircraft 120 (or a particular distance from a navigational reference point or a desired track), the current altitude (or above ground level) of the aircraft 120, and/or the current heading (or bearing) of the aircraft 120. After obtaining current status information for the aircraft, the display process 200 continues by determining the amount of textual aircraft procedure information (e.g., the textual information associated with the symbolic elements of the aircraft procedures displayed within the map) that should be displayed on the navigational map based on the most recently obtained aircraft status, and displaying the determined amount of textual aircraft procedure information on the navigational map (tasks 208, 210). In this regard, the processing system 106 determines the amount of textual aircraft procedure information to be displayed within the map 300 based on the current aircraft status, such that the textual aircraft procedure information most likely to be relevant is displayed while less relevant textual aircraft procedure information is not displayed.

For example, as illustrated in FIG. 3, in some embodiments, the processing system 106 may obtain the current flight phase for the aircraft 120 from the FMS 114 and identify current flight phase as being the arrival phase. In other embodiments, the processing system 106 may obtain the current location of the aircraft 120 and determine that the aircraft 120 is in the arrival phase based on the current location of the aircraft 120 being south and/or east of the MUSTANG reference point 312. As illustrated, in response determining, identifying, or otherwise receiving indication that the aircraft 120 is in the arrival phase, the processing system 106 determines that textual information 311, 313, 315 associated with the symbols 310, 312 and segment 314 of the arrival route procedure should be displayed on the map 300 and that textual information associated with the graphic elements of the approach procedure (e.g., symbols 320, 322, 324, 326, 328, 330 and navigational segments 317, 319, 321, 323, 325, 327, 335) should not be displayed on the map 300. In other words, the processing system 106 determines the arrival procedure information is more likely to be relevant than the approach procedure information due to the aircraft 120 being in the arrival phase.

Figure 5:
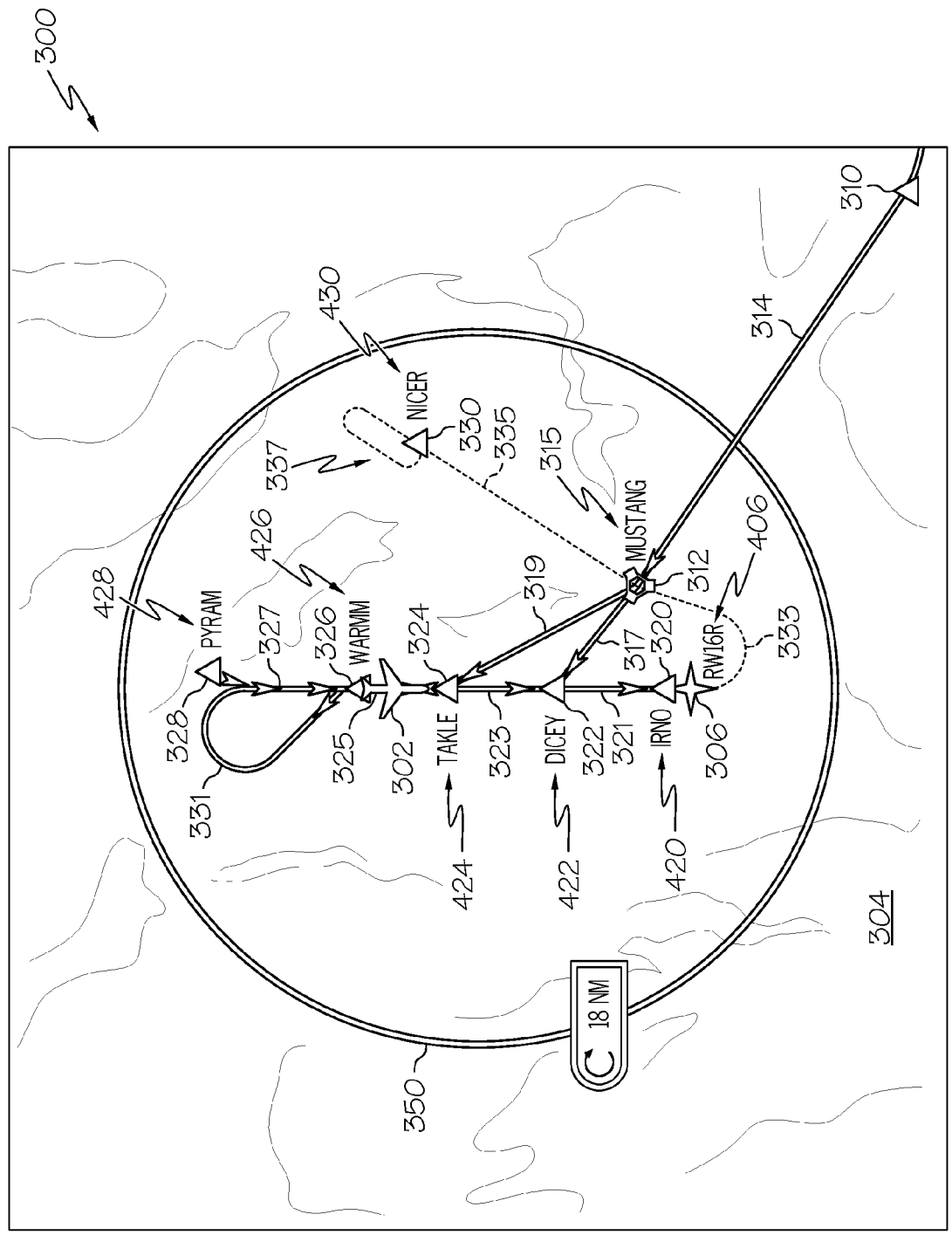
FIGS. 5-7 are schematic views illustrating a sequence of subsequent displays of the navigational map of FIG. 3 in accordance with one embodiment of the display process of FIG. 2.
Figure 6:
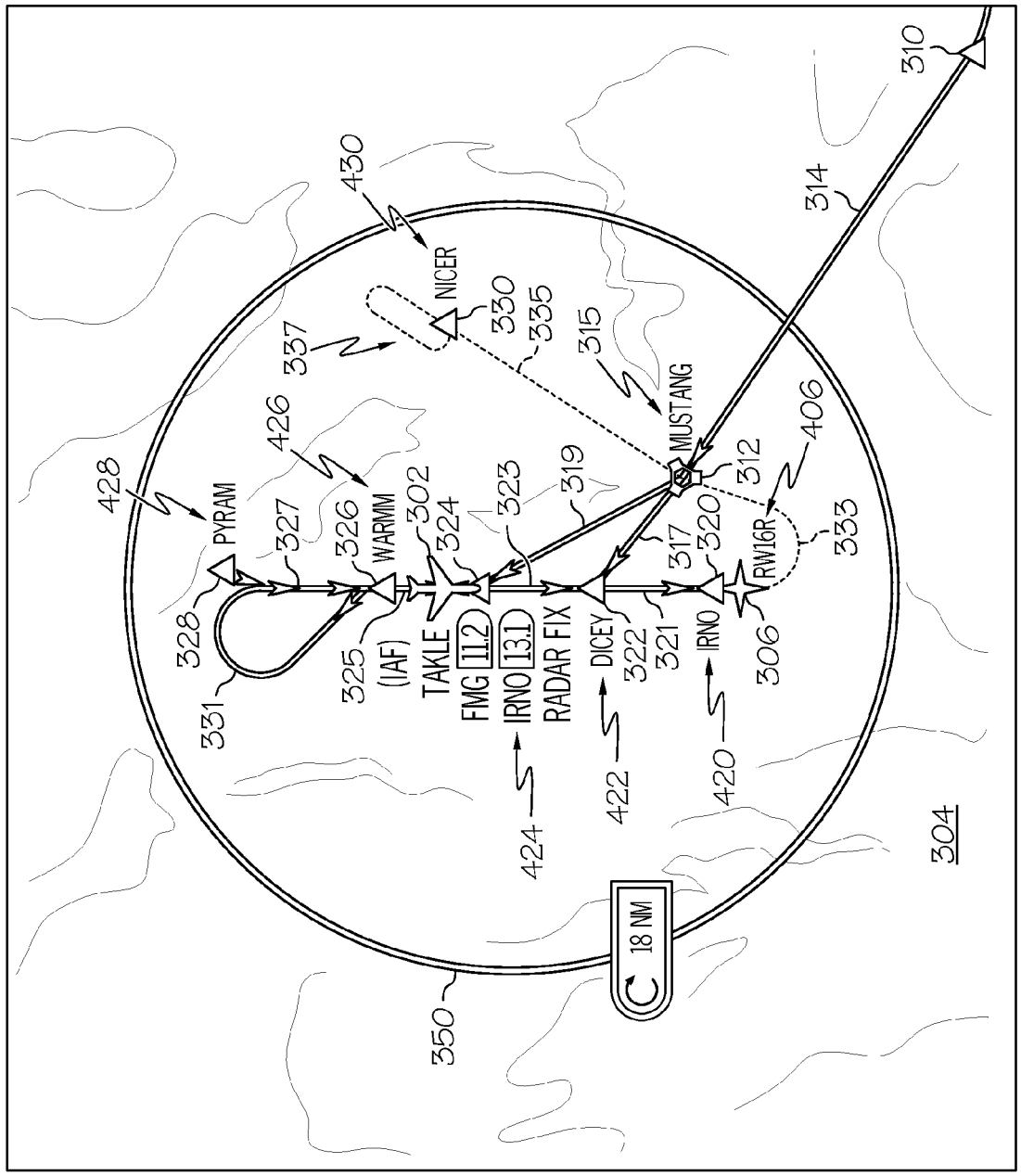
Figure 7:
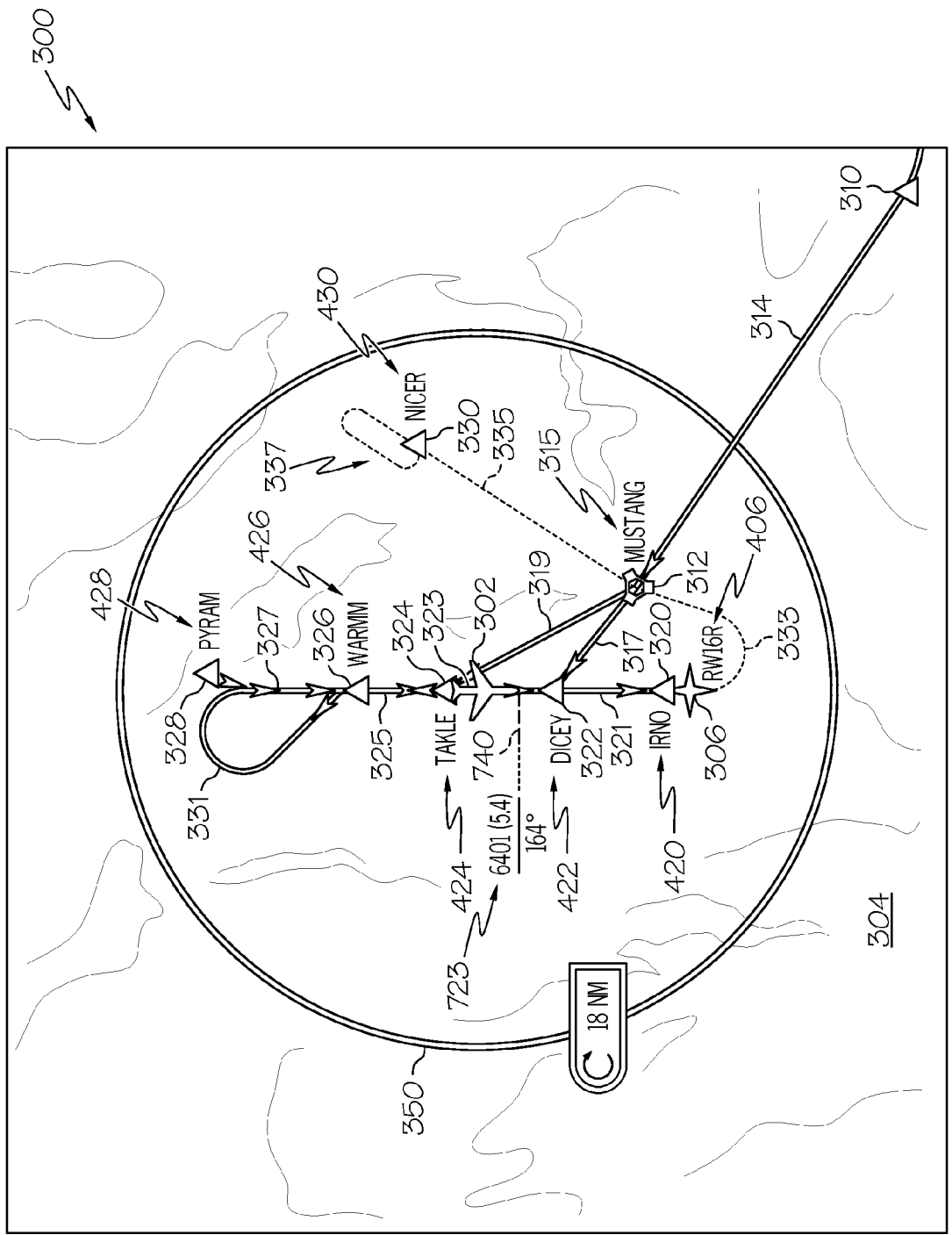

As described in greater detail in the context of FIGS. 5-7, in an exemplary embodiment, the display process 200 determines the amount of textual aircraft procedure information to be displayed based on one or more display settings for the navigational map 300. In this regard, the display settings comprise one or more characteristics that control the manner in which the navigational map 300 appears on the display device 102, such as, for example, an orientation, a center location, and a range setting. In an exemplary embodiment, the display process 200 determines the amount of textual aircraft procedure information to be displayed on the navigational map 300 based on the range setting, and increases and/or decreases that amount in response to changes in the range settings, as described in greater detail below. The range setting for the navigational map 300 corresponds to the field of view for the navigational map 300, that is, the amount of geographical area (e.g., terrain 304) displayed in the navigational map 300. The range setting for the navigational map 300 is inversely related to the scale of the navigational map 300, that is, the ratio of a single unit of distance on the map 300 to a corresponding distance on the ground. As such, a higher range setting corresponds to a lower scale (or a larger field of view) for the navigational map 300 while a lower range setting corresponds to a higher scale (or a smaller field of view) for the navigational map 300. As illustrated, the display system 108 may indicate the range setting for the navigational map 300 by displaying and/or rendering a range ring 350 on the navigational map 300. The range ring 350 comprises a circle that is always displayed with a fixed dimension and/or size on the navigational map 300 and indicates the range setting for the navigational map 300. In accordance with one embodiment, the range setting is equal to the real-world distance that corresponds to (or is equivalent to) the radius of the range ring 350 based on the scale of the navigational map 300. As shown in FIG. 3, the range ring 350 indicates that the radius of the circle defined by the range ring 350 corresponds to a distance of eighteen nautical miles. As described in greater detail below in the context of FIGS. 8-9, when the range setting is reduced (or the navigational map 300 is zoomed in), the amount of distance on the display device 102 between aircraft procedure symbols increases and the lengths of navigational segments increase, thereby allowing for a greater amount of textual aircraft procedure information to be displayed proximate to and/or in association with those symbols and/or segments without obfuscating neighboring symbols, segments and/or textual information. Thus, at lower range settings, the display process 200 determines that a greater amount of textual aircraft procedure information should be displayed on the navigational map 300. Conversely, at higher range settings, the display process 200 determines a lesser amount of textual aircraft procedure information should be displayed on the navigational map 300.

Still referring to FIG. 3, and with reference to FIGS. 1-2, in the illustrated embodiment, based on the range setting of the navigational map 300 (or the distance between symbols 310, 312, which is influenced by the range setting), the processing system 106 determines that only the highest priority textual information associated with the symbols 310, 312 should be displayed on the navigational map 300. As described above, in accordance with one or more embodiments, the categories of textual information associated with the symbols 310, 312 may be assigned priority criterion, wherein the name (or identifier) category may assigned the highest priority value, resulting in the names of the reference points should be displayed proximate to or otherwise in association with the symbols 310, 312. Additionally, based on the range setting of the navigational map 300 (or the length of the navigational segment 314, which is influenced by the range setting) the processing system 106 determines that the bearing information for the segment 314 (e.g., 299°) and the distance information for the segment 314 (e.g., 25 nautical miles) should be displayed on the navigational map 300 along the length of the segment 314. It should be noted that in some embodiments, when the range setting is greater (or the length of the navigational segment 314 decreases), the processing system 106 may determine that the textual information 311 associated with the navigational segment 314 should be displayed offset from the navigational segment 314, rather than along the length of the navigational segment 314, as described in greater detail below in the context of FIGS. 7-9.

Figure 4:
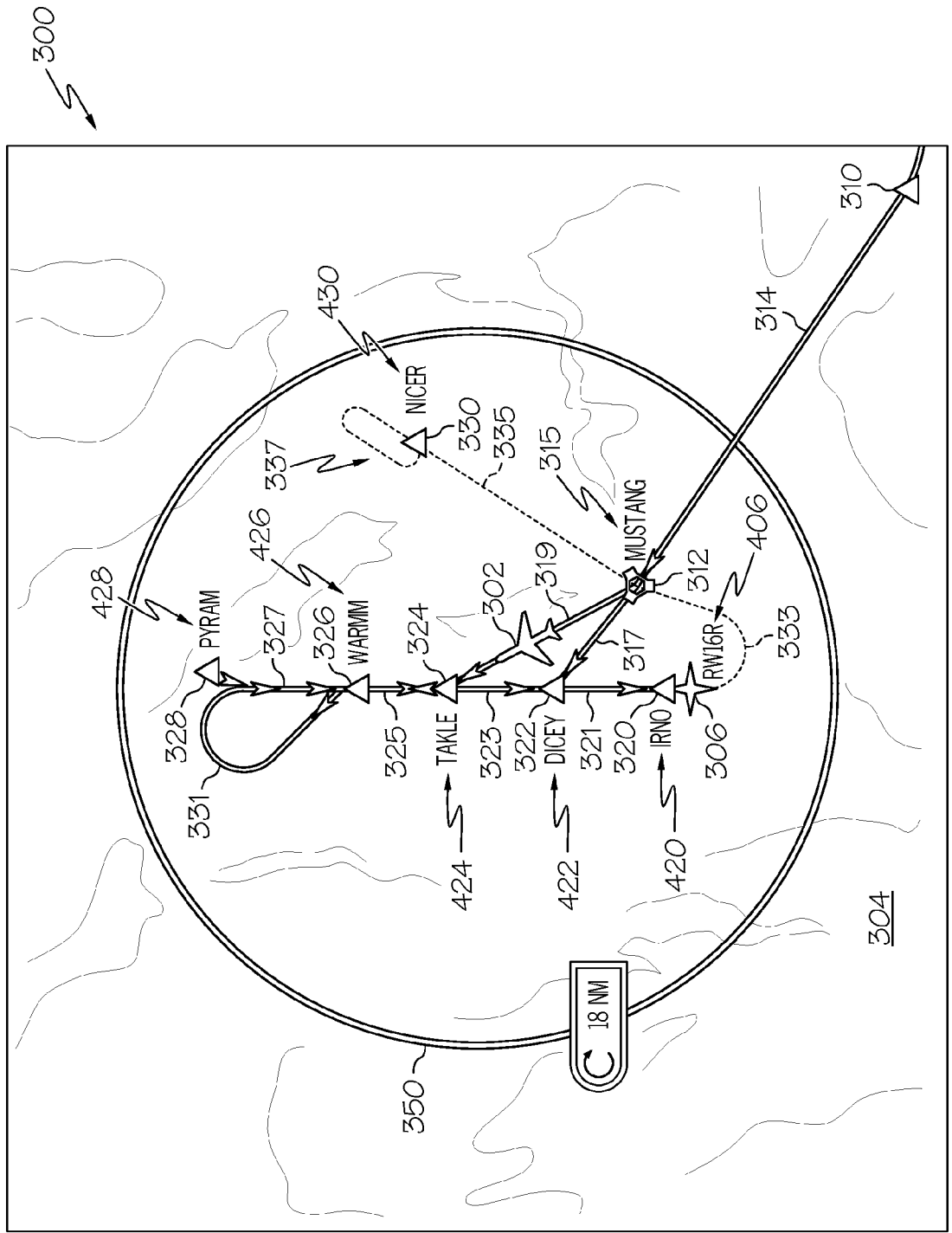
FIG. 4 is a schematic view illustrating a subsequent display of the navigational map of FIG. 3 in accordance with one embodiment of the display process of FIG. 2.

In an exemplary embodiment, the loop defined by tasks 206, 208 and 210 repeats throughout operation of the aircraft 120 to dynamically update the navigational map 300 to reflect the current operating status of the aircraft 120 (e.g., the most recently obtained location, heading, flight phase, and/or the like). In this regard, the processing system 106 and/or display system 108 periodically updates the background 304 and/or aircraft 302 to reflect the real-world position of the aircraft 120 based on the most recently obtained location and/or heading information for the aircraft 120. As illustrated in FIG. 4, during a subsequent iteration of the display process 200, the FMS 114 may indicate to the processing system 106 that the current flight phase for the aircraft 120 has changed from the arrival phase to the approach phase, or alternatively, the processing system 106 may determine that the aircraft 120 is in the approach phase based on the current location of the aircraft 120 as having passed the MUSTANG reference point (e.g., based on the current location of the aircraft 120 being west and/or north of the MUSTANG reference point). As illustrated, in response determining or otherwise receiving indication that the aircraft 120 is in the approach phase, the processing system 106 determines that textual information 311, 313, 315 associated with the symbols 310, 312 and segment 314 of the arrival route procedure should not be displayed on the map 300 and that the textual information 420, 422, 424, 426, 428, 430 associated with the symbols 320, 322, 324, 326, 328, 330 should be displayed on the map 300 because the approach procedure information is now more likely to be relevant than the arrival procedure information due to the aircraft 120 being in the approach phase. In this regard, the processing system 106 updates the navigational map 300 by automatically removing the previously displayed textual aircraft procedure information 311, 313 associated with the symbol 310 and segment 314 of the arrival route procedure and automatically displaying the textual aircraft procedure information 420, 422, 424, 426, 428, 430 in response to the change in the flight phase (or aircraft location). In the illustrated embodiment, based on the range setting of the navigational map 300, the processing system 106 determines that only the highest priority textual information (e.g., the names of the reference points) should be displayed and displays the names proximate to or otherwise in association with their corresponding symbols 320, 322, 324, 326, 328, 330. As illustrated, the textual information 315 associated with symbol 312 may remain on the navigational map 300 because the MUSTANG reference point is part of the approach procedure. Additionally, when the processing system 106 updates the map 300 based on the current aircraft status to include the textual procedure information 420, 422, 424, 426, 428, 430, the processing system 106 may also automatically display textual information 406 identifying the runway associated with the identified instrument approach procedure for airport 306 on the navigational map 300.

Referring now to FIGS. 5-7, and with continued reference to FIGS. 1-4, as described above, the loop defined by tasks 206, 208 and 210 may repeat throughout operation of the aircraft 120 to dynamically increase and/or decrease the amount of textual aircraft procedure information displayed on the navigational map 300 based on the current location of the aircraft 120. As illustrated in FIG. 5 and described above in the context of FIGS. 2-4, based on the range setting of the navigational map 300, the processing system 106 may determine that only the highest priority textual information 420, 422, 424, 426, 428, 430 associated with the approach reference points 320, 322, 324, 326, 328, 330 (e.g., the names of the reference points) should be displayed on the navigational map 300 when the aircraft 120 is in the approach phase.

Turning now to FIG. 6, with continued reference to FIGS. 1-5, in accordance with one or more embodiments, the display process 200 and/or processing system 106 increases the amount of textual information associated with a graphic element of a displayed aircraft procedure that is displayed when the current location of the aircraft 120 indicates the aircraft 120 is at or within a threshold distance of the geographic location associated with (or corresponding to) that graphic element of the displayed aircraft procedure. For example, during each subsequent iteration of the display process 200, the processing system 106 obtains the current location of the aircraft 120 (e.g., task 206). In response to determining that the most recently obtained location of the aircraft 120 is at or within a threshold distance of the TAKLE navigational reference point that corresponds to symbol 324, the processing system 106 updates the displayed textual information 424 to increase the amount of textual information associated with the TAKLE navigational reference point symbol 324 that is displayed on the map 300. In this regard, as described above and illustrated in FIG. 5, based on the range setting for the navigational map 300, the display process 200 and/or processing system 106 may initially determine that only the highest priority textual procedure information associated with the TAKLE navigational reference point (e.g., the name) should be displayed proximate to or otherwise in association with the symbol 324 for the TAKLE reference point. As illustrated in FIG. 6, when the location of the aircraft 120 is within a threshold distance of the TAKLE reference point or otherwise indicates that the aircraft 120 is at or near the TAKLE reference point, the display process 200 and/or processing system 106 determines that some or all of the lower priority textual procedure information associated with the TAKLE reference point should be displayed proximate to or otherwise in association with the symbol 324 for the TAKLE reference point. Thus, as shown in FIG. 6 relative to FIG. 5, when the aircraft 120 approaches or otherwise traverses the location corresponding to the TAKLE reference point, the display process 200 and/or processing system 106 automatically updates the textual information 424 displayed on the navigational map 300 to include all of the textual procedure information associated with the TAKLE reference point (e.g., the initial approach fix designation, the name, the distance from the TAKLE reference point to the MUSTANG reference point (abbreviated FMG), the distance from the TAKLE reference point to the I-RNO reference point) proximate to the symbol 324. As illustrated, in an exemplary embodiment, the display process 200 and/or processing system 106 also increases the size of the font used to display the textual procedure information 424 associated with the symbol 324 when the location of the aircraft 120 is at or within a threshold distance of the reference point associated with the symbol 324.

Referring now to FIG. 7, when the display process 200 and/or processing system 106 subsequently obtains a current location of the aircraft 120 that is not within a threshold distance of the TAKLE navigational reference point, the display process 200 and/or processing system 106 updates the textual information 424 to decrease the amount of textual information associated with the TAKLE navigational reference point that is displayed on the map 300, for example, by reverting to the displayed textual procedure information 424 associated with the TAKLE navigational reference point to include the amount of textual information shown in FIG. 5 where only the highest priority textual procedure information associated with the TAKLE navigational reference point (e.g., the name) is displayed on the map 300 based on the range setting. Additionally, the font size for the textual information 424 may be reduced from the enhanced size of FIG. 6 to the initial size of FIG. 5. Thus, as the aircraft 120 approaches and traverses a navigational reference point, the display process 200 and/or processing system 106 automatically increases the amount of displayed textual procedure information associated with that navigational reference point, and then automatically decreases the amount of displayed textual procedure information at some point after the aircraft 120 has traversed the navigational reference point to declutter the navigational map.

As illustrated in FIG. 7, in a similar manner as described above in the context of FIGS. 5-6 with respect to navigational reference points, the display process 200 and/or processing system 106 may increase and decrease the amount of textual procedure information associated with navigational segments. For example, as illustrated in FIG. 7, the display process 200 and/or processing system 106 may determine to increase the amount of textual procedure information associated with navigational segment 323 between the TAKLE reference point and the DICEY reference point when the current location of the aircraft 120 corresponds to the navigational segment 323. Based on the range setting for the navigational map 300, the display process 200 and/or processing system 106 may initially determine that no textual procedure information associated with the navigational segment 323 should be displayed (e.g., based on the distance between symbols 324, 322 being too small). As illustrated in FIG. 7, after the aircraft 120 passes the TAKLE reference point and the location of the aircraft 120 corresponds to the navigational segment 323 (e.g., an aircraft location between TAKLE and DICEY), the display process 200 and/or processing system 106 may determine that the textual procedure information 723 associated with the navigational segment 323 (e.g., the length of the segment 323, the minimum altitude for the segment 323, and the bearing for the segment 323) should be displayed on the map 300. As shown in FIG. 7, when the length of the navigational segment 323 is too small to display the textual procedure information 723 along the navigational segment 323, the textual procedure information 723 is displayed offset from the navigational segment 323 along with a graphical pointer element 740 indicating the association between the navigational segment 323 and the textual procedure information 723. In an exemplary embodiment, the graphical pointer element 740 is realized as a line segment that extends from the center location of the textual procedure information 723 to the midpoint of the navigational segment 323, and rather than including an arrowhead or another comparable pointing feature, the graphical pointer element 740 fades from being substantially transparent at the center location of the textual procedure information 723 to being substantially opaque at the midpoint of the navigational segment 323 to visually indicate the relationship between the textual procedure information 723 and the navigational segment 323. When the subsequent location of the aircraft 120 is at or within a threshold distance of the DICEY reference point, the display process 200 and/or processing system 106 decreases the amount of textual information associated with the navigational segment 323 that is displayed on the map 300, for example, by reverting to the display of the navigational segment 323 shown in FIGS. 5-6 (e.g., by removing the textual procedure information 723 and graphical pointer element 740).

Figure 8:
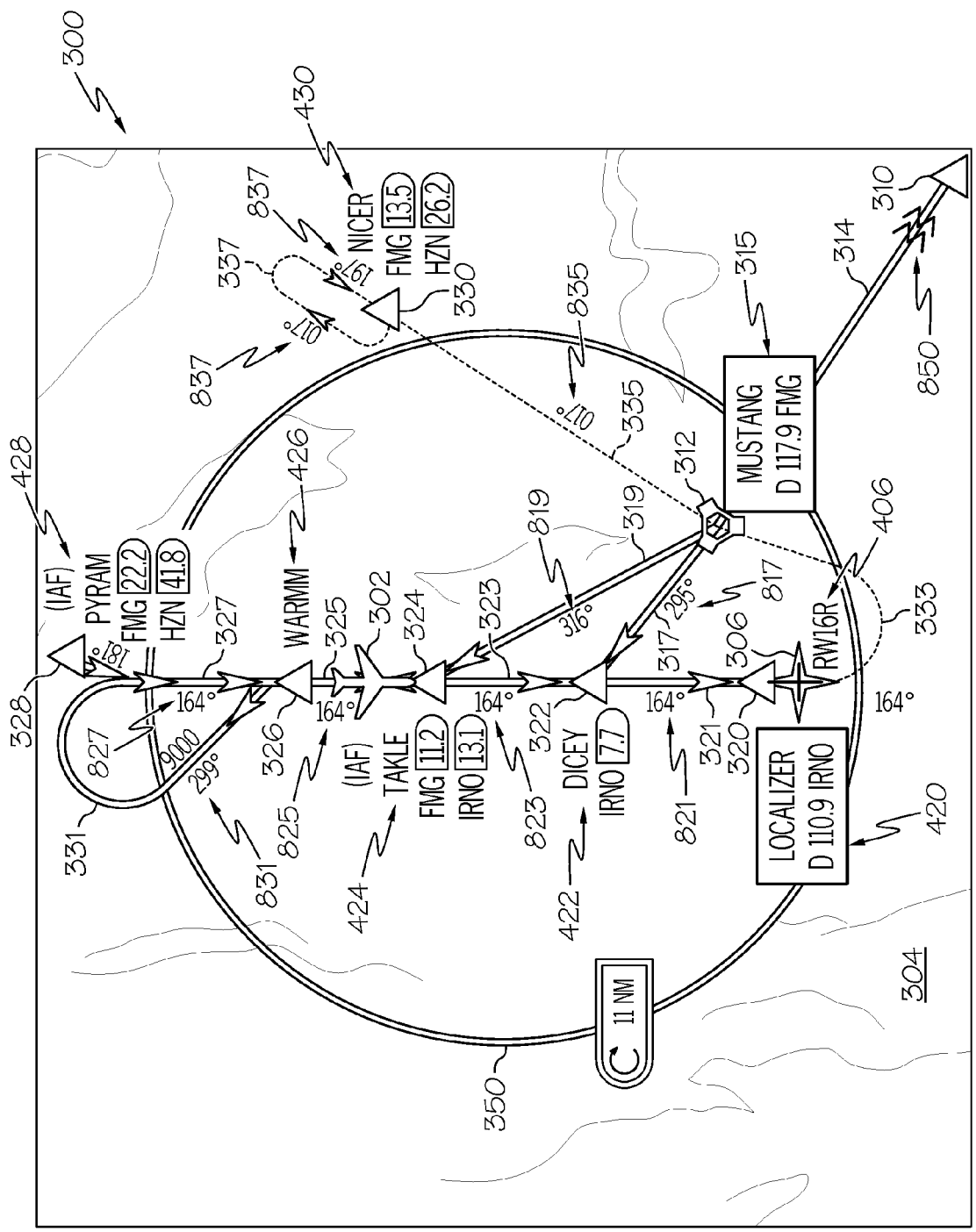
FIGS. 8-9 are schematic views illustrating another sequence of subsequent displays of the navigational map of FIG. 3 in accordance with another embodiment of the display process of FIG. 2.
Figure 9:
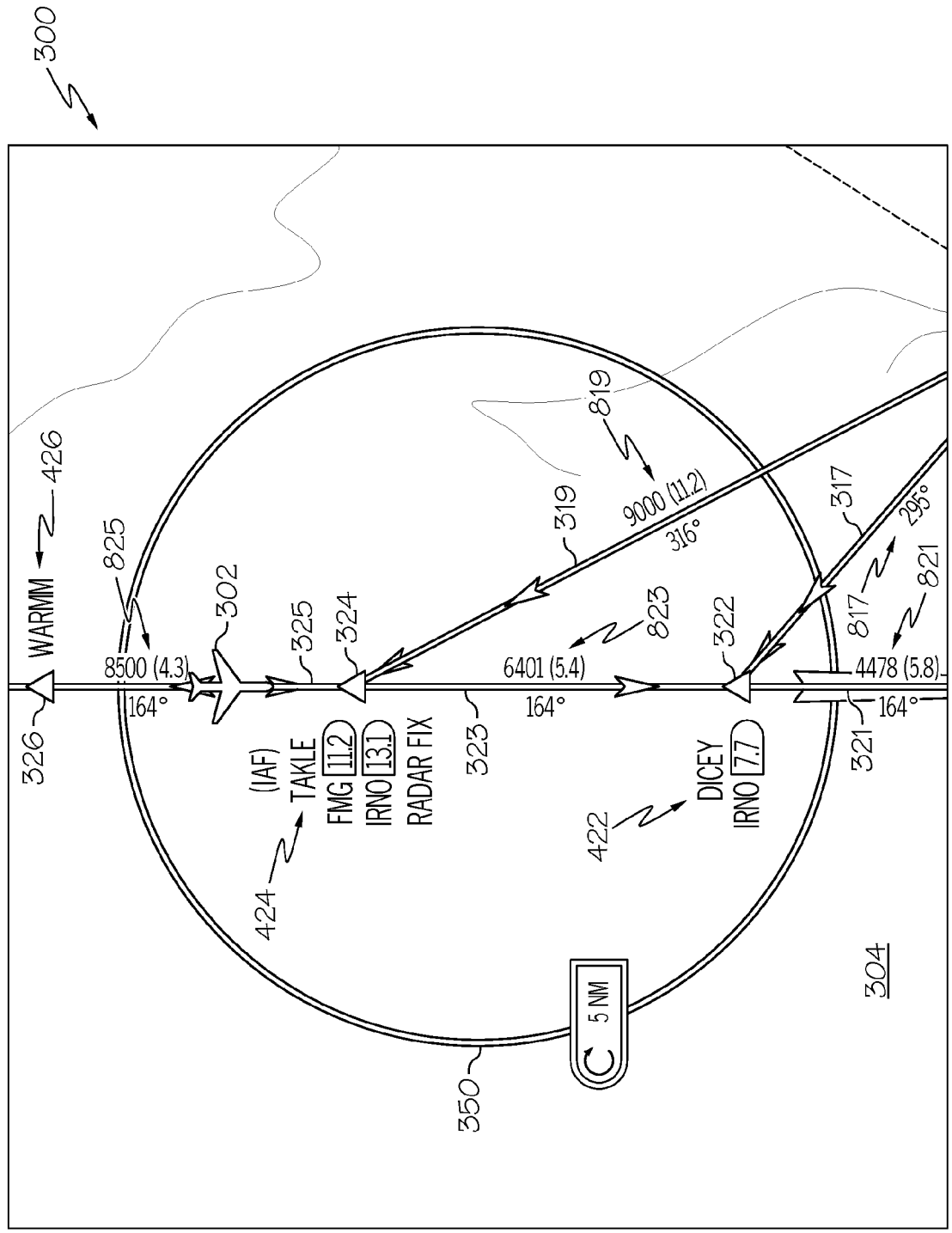

Referring now to FIGS. 8-9, and with continued reference to FIGS. 1-5, as described above, in an exemplary embodiment, the display process 200 and/or processing system 106 determines the amount of textual procedure information to be displayed on the navigational map 300 based on the range setting of the navigational map 300. As illustrated in FIG. 5, at the range setting of 18 nautical miles, the display process 200 and/or processing system 106 may determine to only display the highest priority textual procedure information associated with the symbols 320, 322, 324, 326, 328, 330 based on the range setting and/or the distance between the symbols 320, 322, 324, 326, 328, 330. Turning now to FIG. 8, a user (e.g., pilot and/or co-pilot) may manipulate the user input device 104 to decrease the range setting of the map 300 from 18 nautical miles to 11 nautical miles. In response to the decrease in the range setting, the display process 200 and/or processing system 106 determines an increased amount of textual procedure information to be displayed and automatically updates the navigational map 300 to include the increased amount of textual procedure information. As illustrated, at the range setting of 11 nautical miles, the display process 200 and/or processing system 106 determines lower priority textual procedure information (e.g., distances between other navigational reference points) associated with the symbols 312, 320, 322, 324, 328, 330 should be displayed and automatically updates the displayed textual information 315, 420, 422, 424, 428, 430 to include the lower priority textual procedure information. Additionally, in response to the decrease in the range setting, the display process 200 and/or processing system 106 determines or otherwise identifies that higher priority textual procedure information associated with the navigational segments 317, 319, 321, 323, 325, 327, 335, procedure turn 331, and missed approach 337 should be displayed and automatically updates the navigational map 300 to include the textual information 817, 819, 821, 823, 825, 827, 831, 835, 837 identified for display. As shown, the displayed textual information 817, 819, 821, 823, 825, 827, 835, 837 for the navigational segments and missed approach include bearing (or heading) information for those respective segments, while the displayed textual information 831 for the procedure turn includes a minimum altitude criterion (e.g., 9000 feet) in addition to bearing information.

In some embodiments, when the decrease in the range setting of the map 300 results in a previously displayed graphic element no longer being within the geographical area of the map 300, the display process 200 and/or processing system 106 may maintain the graphic element displayed within the map 300 but include graphical indicia to indicate the graphic element is outside the geographic area of the map 300. For example, as illustrated in FIG. 8, in response to a decrease in the range setting, the display process 200 and/or processing system 106 may maintain the symbol 310 displayed on the navigational map 300 but include graphical indicia 850 proximate the symbol 310 and overlying the navigational segment 314 to/from that symbol 310 to indicate that the geographic location of the RYANN reference point that corresponds to symbol 310 is outside of the geographic area displayed on the map 300.

Turning now to FIG. 9, the user may further decrease the range setting of the map 300 from 11 nautical miles to 5 nautical miles, wherein in response, the display process 200 and/or processing system 106 further increases the amount of textual procedure information displayed on the navigational map 300. As illustrated, at the range setting of 5 nautical miles, the display process 200 and/or processing system 106 determines additional lower priority textual procedure information (e.g., the minimum altitude for the segments and the distance for the segments) associated with the navigational segments 319, 321, 323, 325 within the displayed area of the navigational map 300 should be displayed and automatically updates the displayed textual information 819, 821, 823, 825 to include the lower priority textual procedure information.

Additionally, at the reduced range setting, the display process 200 and/or processing system 106 determines additional lower priority textual procedure information (e.g., the radar fix designation) associated with the TAKLE navigational reference point 324 should be displayed and automatically updates the displayed textual information 824 to include the additional lower priority textual procedure information.

Figure 10:
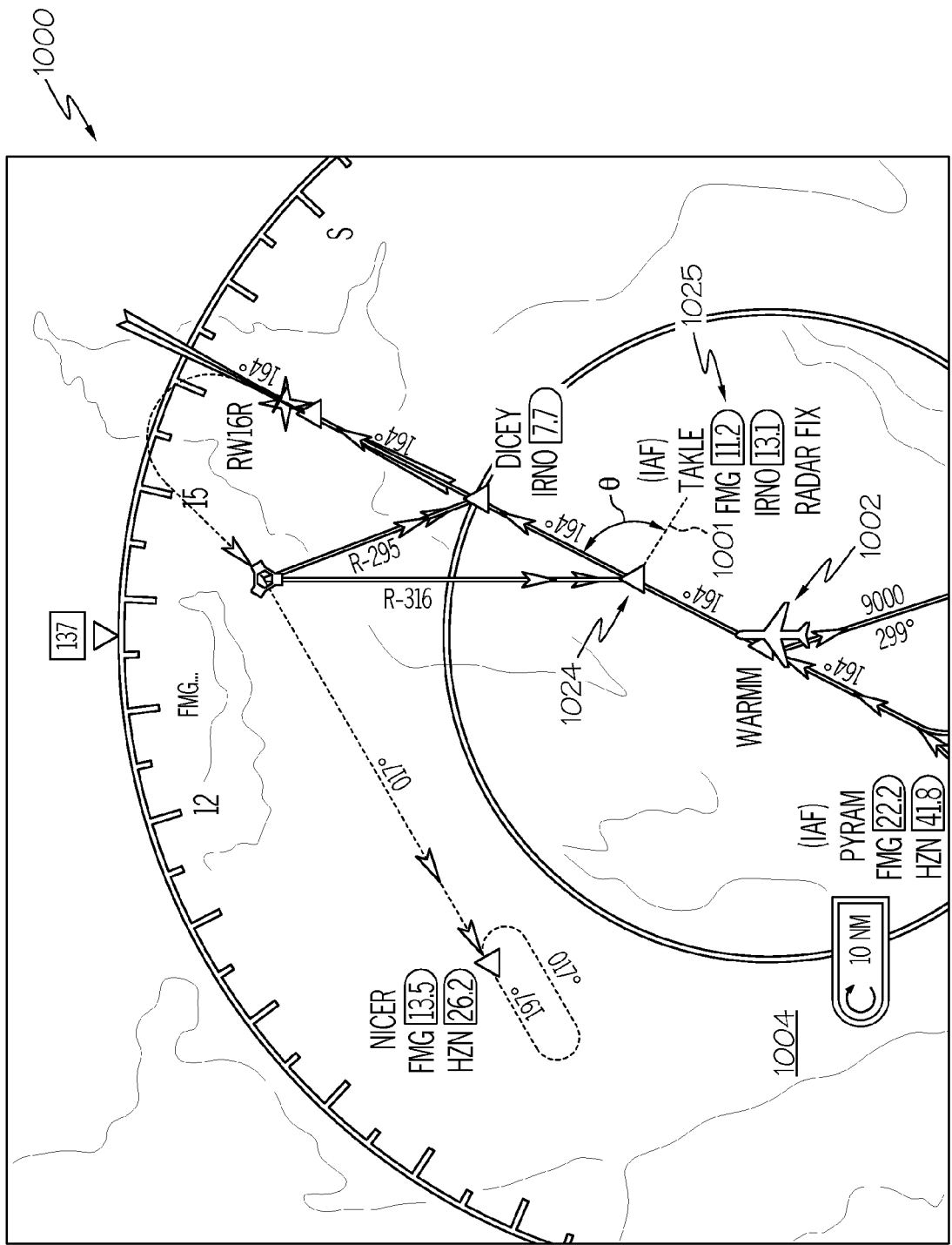
FIGS. 10-11 are schematic views of another exemplary navigational map suitable for use with the display process of FIG. 2 in accordance with one or more embodiments.
Figure 11:
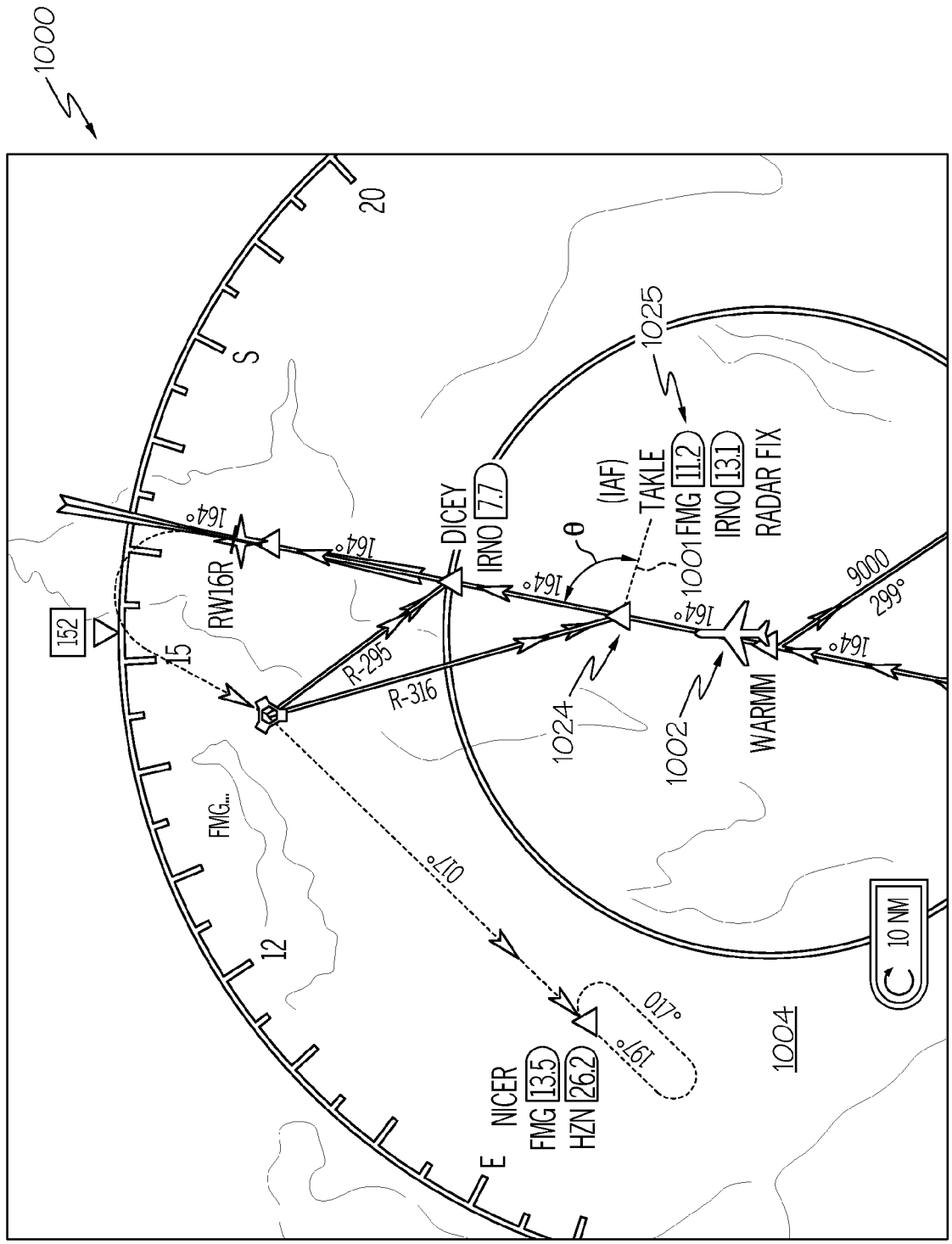

Referring now to FIGS. 10-11, in accordance with one or more embodiments, when the orientation of a navigational map 1000 is heading-up (or track-up) (i.e., aligned such that the graphical representation 1002 of the aircraft 120 is always traveling in an upward direction and the background 1004 adjusted accordingly), the textual aircraft procedure information is radially positioned with respect to the graphic aircraft procedure information. For example, as shown in FIG. 10, the center of the textual procedure information 1025 associated with the TAKLE reference point symbol 1024 is offset from the symbol 1024 along a radius 1001 that is maintained by the data storage element 118 in association with the textual information 1025. In an exemplary embodiment, the radius 1001 has a fixed length that corresponds to a desired separation distance on the display device 102 between the center of the textual information 1025 and the symbol 1024 (e.g., half an inch between the textual information 1025 and the symbol 1024 when displayed on the display device 102). In an exemplary embodiment, the radius 1001 has a fixed offset angle (or bearing) relative to the symbol 1024 that defines the positioning of the information 1025 when the navigational map 1000 is oriented north-up (i.e., when the aircraft 120 is heading due north or 0°). In this regard, the fixed offset angle is chosen to ensure that the information 1025 does not overlap neighboring procedure information (e.g., navigational segments to/from the TAKLE reference point or adjacent navigational reference points). For example, the radius 1001 for the information 1025 associated with the TAKLE symbol 1024 may have an offset angle of 270°. In this regard, as the aircraft 120 travels, the information 1025 is always displayed at a bearing of 270° relative to the symbol 1024 and at a fixed distance on the display device 102 from the symbol 1024 as defined by the radius 1001. As illustrated in FIG. 11 relative to FIG. 10, as the heading of the aircraft 120 changes from 137° to 152° (or a 15° rotation in the clockwise direction), the background 1004 and the symbolic procedure information are rotated by −15° (or 15° in the counterclockwise direction) offset the change in the heading of the aircraft 120, such that the graphical representation 1002 of the aircraft 120 remains oriented toward the top of the map 1000. The displayed textual aircraft procedure information is rotated in a corresponding manner and radially repositioned to prevent the displayed textual aircraft procedure information from overlapping or otherwise obscuring other displayed aircraft procedure information. For example, as illustrated, the information 1025 is rotated in a corresponding manner (e.g., by −15° to offset the 15° rotation of the aircraft 120 and remain upright) and is radially repositioned using the radius 1001 associated with the information 1025, such that the center of the information 1025 remains displayed at a bearing of 270° relative to the symbol 1024 and the same distance on the display device 102 from the symbol 1024. As illustrated in FIG. 11, the rotation of the textual information 1025 by a corresponding amount opposite the change in the aircraft heading results in the orientation of the textual information 1025 remaining right-side up.

Figure 12:
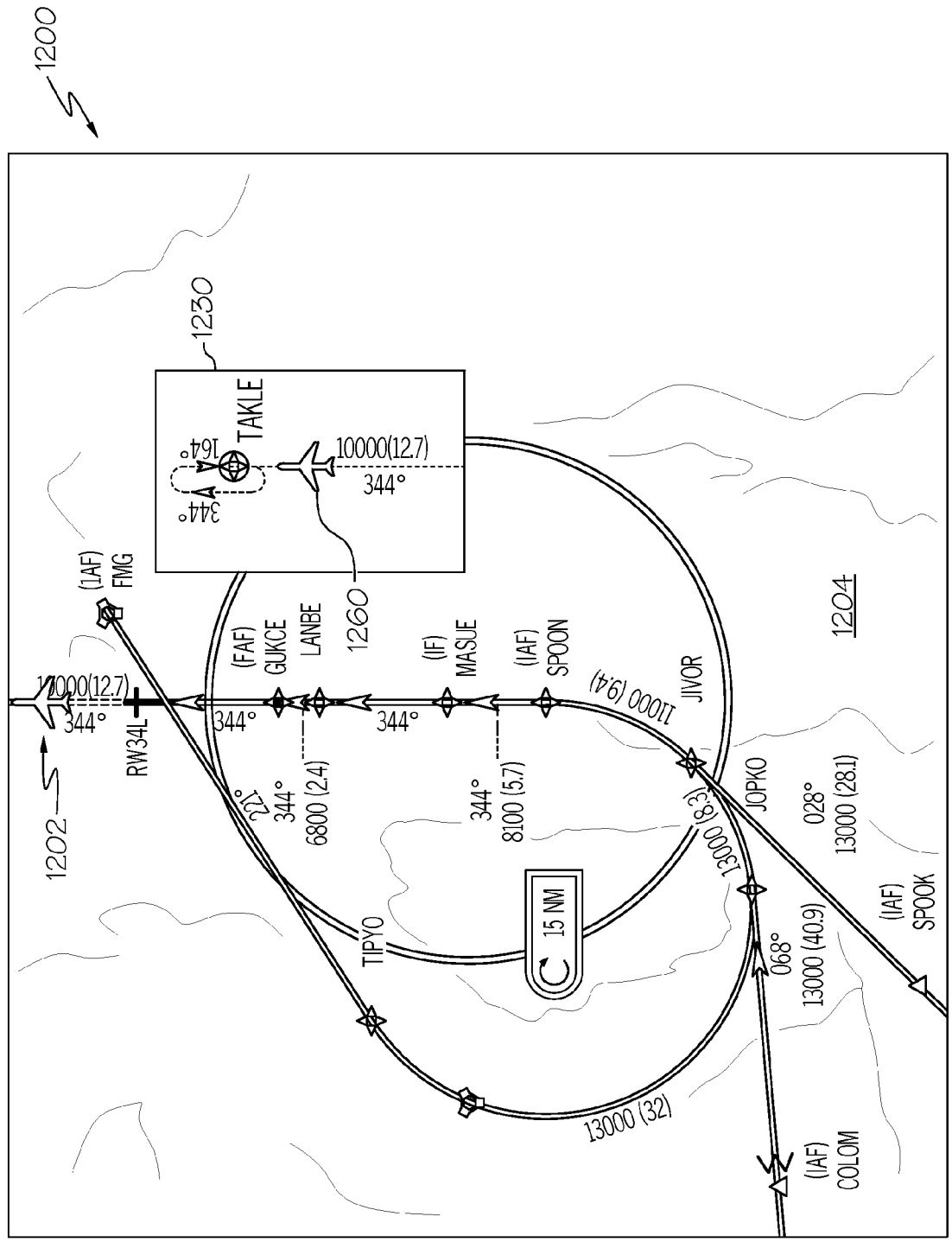
FIG. 12 is a schematic view of another exemplary navigational map suitable for use with the display process of FIG. 2 in accordance with one or more embodiments.

FIG. 12 depicts another embodiment of a navigational map 1200 in accordance with another embodiment of the display process 200. As described, the processing system 106 and/or display process 200 periodically and/or continuously obtains current status information for the aircraft 120 (e.g., current flight phase and/or location). In the illustrated embodiment, the processing system 106 and/or display process 200 determines or otherwise identifies that the current flight phase of the aircraft 120 is the missed approach flight phase (e.g., based on the current location of the aircraft 120 indicating the aircraft 120 has passed the intended airport 1206), and in response to determining the aircraft 120 is in the missed approach flight phase, the processing system 106 and/or display process 200 automatically displays the missed approach procedure information 1230 overlying the navigational map 1200. In this regard, when the geographic location of the missed approach procedure information 1230 is outside the geographic area of the navigational map 1200, the processing system 106 and/or display process 200 displays the missed approach procedure information 1230 as an inset within the navigational map 1200. In other words, the missed approach procedure information 1230 overlies the background 1204 of the navigational map 1200 at a location that does not accurately reflect the real-world location of the missed approach procedure information 1230 with respect to the underlying terrain 1204. As illustrated, in addition to displaying a graphical representation 1202 of the aircraft 120 overlying the navigational map 1200, the processing system 106 and/or display process 200 may also display a second graphical representation 1260 of the aircraft 120 at the appropriate geographic location within the missed approach procedure inset 1230. In this regard, the positioning of the second graphical representation 1260 of the aircraft 120 with respect to the displayed graphic elements of the missed approach procedure information 1230 accurately reflects the real-world location of the aircraft 120 with respect to the geographic locations corresponding to those displayed graphic elements. In other words, the second graphical representation 1260 of the aircraft 120 refreshes or otherwise updates as the aircraft 120 travels, such that the graphical representation 1260 is positioned over the graphic elements of the missed approach procedure information 1230 in a manner that accurately reflects the current (e.g., instantaneous or substantially real-time) real-world positioning of the aircraft 120 relative to the navigational reference points and/or navigational segments of the missed approach procedure 1230. As described above, the other aircraft graphic 1202 reflects the real-world location of the aircraft 120 with respect to the underlying terrain 1204.

To briefly summarize, one advantage of the methods and systems described above is that relevant aircraft procedure information is displayed overlying a navigational map in a decluttered manner. For example, as described above, when a user increases the range setting (or zooms out), the amount of displayed aircraft procedure information is automatically decreased to prevent obscuring and/or obfuscating neighboring aircraft procedure information. At the same time, after the amount of displayed aircraft procedure information is decreased, when the flight phase and/or current location of the aircraft indicates that some additional aircraft procedure information that is not currently displayed may be relevant to the current operation of the aircraft, the amount of displayed aircraft procedure information is increased to provide the additional information that is likely to be relevant. At some subsequent time, after the amount of displayed aircraft procedure information is increased, when the flight phase and/or current location of the aircraft indicates that some additional aircraft procedure information that is currently displayed may no longer be relevant to the current operation of the aircraft, the amount of displayed aircraft procedure information may be decreased to declutter the navigational map. Additionally, the displayed aircraft procedure information may also be dynamically increased and/or decreased in size based on the current operating status of the aircraft. As described above, in various situations, textual procedure information may be radially repositioned with respect to and/or offset from its associated graphic procedure element to ensure the textual procedure information is displayed in a clear and conspicuous manner. Furthermore, portions of the aircraft procedure information that are outside the geographic area of the navigational map may be inset within the navigational map or displayed with graphical indicia that designates those portions of the aircraft procedure information are outside of the map area.

Again, it should be appreciated that although the subject matter may described herein in the context of instrument approach procedures and/or arrival routes for purposes of explanation, the subject matter is not intended to be limited to an approach procedure, and in practice, the subject matter may be implemented for departures, climbs, or other aircraft actions having associated aircraft procedure information that may displayed on display device 102 in an equivalent manner as described below. As used herein, an approach should be understood as referring to a predefined flight path or other guidance intended to facilitate a safe landing for an aircraft at a particular runway, landing strip, airstrip, another suitable landing location, or a set of landing locations. Furthermore, it should be noted that although the subject matter may be described herein in the context of a navigational map being associated with a current location and/or heading of the aircraft (e.g., a moving map display), the subject matter is not limited to navigational maps associated with the location of the aircraft. For example, in a briefing mode, the user may manipulate a user input device to scroll the navigational map away from the current location of the aircraft to view other portions of a flight plan, or to simulate and/or brief upcoming portions of the flight plan. In this regard, a graphical representation of the aircraft need not be displayed in the navigational map, however, the systems and methods described herein may still be utilized to determine the amount of procedure information to be displayed in the navigational map and dynamically update the displayed procedure information, even though the aircraft is not displayed on the navigational map. Furthermore, in a briefing mode, the current status information (e.g., aircraft flight phase and/or aircraft location) relied on by the methods and systems described above may be provided or otherwise by the user to emulate operation of the aircraft.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by processing system 106), facilitate display of aircraft procedure information overlying a navigational map on a display device (e.g., display device 102) in accordance with the display process 200 described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It being understood that various changes may be made in the function and arrangement of elements described in an exemplary embodiment without departing from the scope of the subject matter as set forth in the appended claims.

What is claimed is:

1. A method for presenting information on a display device associated with an aircraft, the method comprising:
    displaying, on the display device, a navigational map;
    displaying, on the display device overlying the navigational map, a graphic element of an aircraft procedure, the graphic element illustrating an aspect of an aircraft action and having textual information associated therewith, the textual information describing operating parameters or instructions for executing the aircraft action;
    obtaining status information for the aircraft;
    determining an amount of the textual information to be displayed based at least in part on the status information; and
    displaying, on the display device overlying the navigational map, the determined amount of the textual information proximate the graphic element.

2. The method of claim 1, the status information including a current location of the aircraft, wherein the method further comprises:
    increasing the amount of the textual information displayed on the display device when a distance between the current location of the aircraft and a location associated with the graphic element is less than a threshold value; and
    decreasing the amount of the textual information displayed on the display device when the distance between the current location of the aircraft and the location associated with the graphic element is greater than the threshold value.

3. The method of claim 1, further comprising increasing the amount of the textual information displayed on the display device when a distance between a location of the aircraft and a location associated with the graphic element is less than a threshold value.

4. The method of claim 1, further comprising increasing a size of the textual information displayed on the display device when a distance between a location of the aircraft and a location associated with the graphic element is less than a threshold value.

5. The method of claim 1, further comprising decreasing the amount of the textual information displayed on the display device when a distance between a location of the aircraft and a location associated with the graphic element is greater than a threshold value.

6. The method of claim 1, further comprising updating the amount of the textual information displayed on the display device in response to a change in the status information.

7. The method of claim 1, the aircraft procedure having an associated flight phase, wherein the method further comprises:
    identifying a current flight phase of the aircraft based on the status information; and
    increasing the amount of the textual information displayed on the display device when the current flight phase corresponds to the associated flight phase.

8. The method of claim 7, the aircraft procedure comprising an approach procedure associated with an approach phase, wherein the amount of the textual information displayed on the display device is increased when the current flight phase corresponds to the approach phase.

9. The method of claim 1, wherein the amount of the textual information to be displayed on the display device is determined based on a display setting for the navigational map and the status information.

10. The method of claim 9, further comprising adjusting the amount of the textual information displayed on the display device in response to a change in the display setting.

11. The method of claim 10, the display setting comprising a range setting, wherein adjusting the amount of the textual information displayed comprises:
    increasing the amount of the textual information displayed on the display device in response to a decrease in the range setting; and
    decreasing the amount of the textual information displayed on the display device in response to an increase in the range setting.

12. The method of claim 9, the display setting comprising a range setting, wherein the method further comprises graphically indicating an association between the textual information and the graphic element in response to an increase in the range setting.

13. The method of claim 12, the graphic element comprising a navigational segment, the textual information being initially displayed along the navigational segment, wherein graphically indicating the association comprises:
    displaying the textual information offset from the navigational segment in response to the increase in the range setting; and
    displaying a line segment between the navigational segment and the textual information.

14. The method of claim 1, further comprising:
    updating the navigational map in response to a change in a heading of the aircraft; and
    radially repositioning the textual information with respect to the graphic element in a manner that is influenced by the change in the heading of the aircraft.

15. The method of claim 1, wherein the determined amount of the textual information and the graphic element are displayed as an inset within the navigational map.

16. The method of claim 1, further comprising dynamically increasing or decreasing the amount of the textual aircraft procedure information displayed on the navigational map.

17. The method of claim 1, the graphic element corresponding to a navigational reference point, wherein the method further comprises displaying a graphical indicia proximate the graphic element when a geographic location of the navigational reference point is outside a geographic area of the navigational map.

18. A method for presenting an aircraft procedure prescribing operation of an aircraft on a display device associated with the aircraft, the method comprising:
　displaying, on the display device, a navigational map associated with a current location of the aircraft;
　displaying, on the display device, a graphic element of the aircraft procedure overlying the navigational map, the graphic element having textual information associated therewith;
　obtaining a display setting for the navigational map;
　obtaining status information for the aircraft;
　determining a subset of the textual information to be displayed based on the status information and the display setting; and
　displaying, on the display device, the subset of the textual information.

19. The method of claim 18, further comprising:
　decreasing an amount of textual information displayed in response to a change in the display setting; and
　after decreasing the amount of textual information, increasing the amount of textual information in response to a change in the status information.

20. The method of claim 18, further comprising:
　increasing an amount of textual information displayed in response to a change in the display setting; and
　after increasing the amount of textual information, decreasing the amount of textual information in response to a change in the status information.

21. The method of claim 18, wherein determining the subset of the textual information comprises:
　identifying a first category of the textual information for display based on a first priority criterion associated with the first category; and
　excluding a second category of the textual information from the subset based on a second priority criterion associated with the second category, the second priority criterion being lower than the first priority criterion.

22. A system comprising:
　a display device onboard an aircraft, the display device having a navigational map pertaining to operation of the aircraft displayed thereon;
　a data storage element configured to maintain procedure information for an aircraft procedure, the procedure information including a graphic element illustrating an aspect of an aircraft action and textual information associated with the graphic element, the textual information describing operating parameters or instructions for executing the aircraft action; and
　a processing system coupled to the display device and the data storage element, wherein the processing system is configured to:
　　display, on the display device, the graphic element overlying the navigational map;
　　obtain status information for the aircraft;
　　determine an amount of the textual information to be displayed based at least in part on the status information; and
　　display, on the display device, the determined amount of textual information overlying the navigational map proximate the graphic element.

23. The method of claim 16, the status information including a current location of the aircraft, wherein dynamically increasing or decreasing the amount of the textual aircraft procedure information displayed on the navigational map comprises:
　increasing the amount of the textual information displayed on the display device when a distance between the current location of the aircraft and a location associated with the graphic element is less than a threshold value; and
　decreasing the amount of the textual information displayed on the display device when the distance between the current location of the aircraft and the location associated with the graphic element is greater than the threshold value.

* * * * *